(12) United States Patent
Hall et al.

(10) Patent No.: US 9,969,228 B2
(45) Date of Patent: May 15, 2018

(54) VEHICLE INBOARD SUSPENSION SYSTEM

(71) Applicants: David R. Hall, Provo, UT (US); Stephen R. Hall, Draper, UT (US); Christopher Johnson, Provo, UT (US); Jason Simpson, Provo, UT (US)

(72) Inventors: David R. Hall, Provo, UT (US); Stephen R. Hall, Draper, UT (US); Christopher Johnson, Provo, UT (US); Jason Simpson, Provo, UT (US)

( * ) Notice: Subject to any disclaimer, the term of this patent is extended or adjusted under 35 U.S.C. 154(b) by 54 days.

(21) Appl. No.: 15/280,188

(22) Filed: Sep. 29, 2016

(65) Prior Publication Data

US 2018/0086163 A1 Mar. 29, 2018

(51) Int. Cl.
*B60G 3/20* (2006.01)
*B60G 15/06* (2006.01)
*B62D 21/07* (2006.01)
*B62D 61/06* (2006.01)

(52) U.S. Cl.
CPC ............. *B60G 3/20* (2013.01); *B60G 15/068* (2013.01); *B62D 21/07* (2013.01); *B60G 2200/144* (2013.01); *B60G 2200/154* (2013.01); *B60G 2200/156* (2013.01); *B60G 2202/312* (2013.01); *B60G 2204/128* (2013.01); *B60G 2204/43* (2013.01); *B62D 61/065* (2013.01)

(58) Field of Classification Search
CPC .. B60G 3/20; B60G 15/068; B60G 2200/144; B60G 2200/154; B60G 2200/156; B60G 2200/17; B60G 2202/312; B60G 2204/128; B60G 2204/129; B60G 2204/43; B62D 21/07; B62D 61/06; B62D 61/065; B62D 61/08
See application file for complete search history.

(56) References Cited

U.S. PATENT DOCUMENTS

| | | | | |
|---|---|---|---|---|
| 4,881,752 A * | 11/1989 | Tanaka | ..................... | B60G 3/20 280/124.128 |
| 5,080,389 A * | 1/1992 | Kawano | ................... | B60G 3/20 280/124.142 |
| 6,086,077 A * | 7/2000 | Stuart | .................. | B60G 11/107 280/124.116 |
| 6,170,838 B1 * | 1/2001 | Laurent | .................... | B60G 3/01 280/124.127 |
| 6,550,796 B2 * | 4/2003 | Behr | ........................ | B60G 3/20 267/254 |
| 7,607,671 B2 * | 10/2009 | McConville | ............. | B60G 3/20 280/124.134 |
| 7,883,099 B2 * | 2/2011 | Byers | ................... | A63H 17/262 280/124.135 |

(Continued)

*Primary Examiner* — Laura Freedman

(57) ABSTRACT

A vehicle suspension system is described that includes a frame, a control arm assembly, a bell crank, and a shock. The control arm assembly includes upper and lower control arms. The bell crank is disposed above the upper control arm and is pivotally coupled to the upper control arm and the frame. The shock is coupled to the bell crank and the frame, and is disposed between the bell crank and a vehicle passenger compartment. In some embodiments, the bell crank is coupled to the upper control arm by a pushrod. Additionally, in some embodiments, the frame is a unitized frame and/or includes an engine cowling, and the bell crank is coupled to the engine cowling.

20 Claims, 12 Drawing Sheets

(56) References Cited

U.S. PATENT DOCUMENTS

| | | | | |
|---|---|---|---|---|
| 7,914,025 B2* | 3/2011 | Mayen | ............... | B60G 3/20 |
| | | | | 280/124.109 |
| 9,517,673 B2* | 12/2016 | Izak | ............... | B60G 17/00 |
| 9,731,572 B2* | 8/2017 | Tamura | ............... | B60K 7/0007 |
| 2016/0159180 A1* | 6/2016 | Palatov | ............... | B60G 3/26 |
| | | | | 280/5.507 |

* cited by examiner

VEHICLE INBOARD SUSPENSION SYSTEM

TECHNICAL FIELD

This invention relates generally to the field of vehicle suspension systems and more particularly to inboard suspension systems.

BACKGROUND

In vehicle suspension design, the name of the game is "increase traction." Three ways to increase traction include: implementing independent suspension, reducing wheel camber, and reducing unsprung mass. One popular suspension system, the double wishbone system, addresses the first two issues, whereas another popular system, the Macpherson suspension system, addresses the first and third issues. Multi-link suspension systems address all three issues, but are significantly more complex than the double wishbone and Macpherson systems. Thus, a simple solution is needed that accomplishes the three goals listed above without compounding the complexity of the system.

SUMMARY OF THE INVENTION

A vehicle suspension system is described herein that improves on the previous suspension systems described above. The system includes a unitized frame, a control arm assembly, a pushrod, a bell crank, and a shock assembly. The unitized frame includes a passenger compartment and, in some embodiments, an engine compartment separated from the passenger compartment by a firewall. The control arm assembly includes upper and lower control arms and a steering knuckle pivotally coupled between the upper and lower control arms. The pushrod is coupled to the upper control arm, and extends above the upper control arm. The bell crank is disposed adjacent to the upper control arm between the passenger compartment and the pushrod, and includes a cylindrical portion rotationally coupled to the frame and first and second arms extending from the cylindrical portion. The first arm is pivotally coupled to the pushrod, and the second arm is pivotally coupled to the shock. The shock is also coupled to the frame, and is disposed between the bell crank and a vehicle passenger compartment.

The vehicle suspension system described immediately above improves on previous designs in a number of ways. First, by coupling the shock, the bell crank, and the control arm assembly to a unitized structure, the force exerted by the sprung mass of the vehicle is broadly distributed. Second, by moving the shock and bell crank over the upper control arm, more room is available for a drive axle in front wheel drive vehicles as compared with double wishbone, and multi-link systems. This also makes maintenance of the drive axle and suspension components simpler. Third, linkage allows for placement of suspension components horizontally closer to the lengthwise center of the vehicle. By relocating the reactive suspension components in the horizontal plane, the center of gravity is lowered compared to Macpherson systems, and the unsprung mass is reduced compared to double wishbone systems. This is particularly important for vehicles with most mass concentrated at one end of the vehicle, helping to shift the center of gravity closer to the lengthwise center of the vehicle. Fourth, as described in more detail below, the angles formed between the upper control arm and the pushrod, the pushrod and the bell crank, and the bell crank and the shock allow for progressive damping, where the shock is compressed and extended less than the length of travel of the wheel. The additional energy is absorbed by the frame and/or dissipated through the pivoting motion between the various suspension components.

BRIEF DESCRIPTION OF THE DRAWINGS

A more particular description of the invention briefly described above is made below by reference to specific embodiments. Several embodiments are depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

The descriptions of the various embodiments include, in some cases, references to elements described with regard to other embodiments. Such references are provided for convenience to the reader, and to provide efficient description and enablement of each embodiment, and are not intended to limit the elements incorporated from other embodiments to only the features described with regard to the other embodiments. Rather, each embodiment is distinct from each other embodiment. Despite this, the described embodiments do not form an exhaustive list of all potential embodiments of the claimed invention; various combinations of the described embodiments are also envisioned, and are inherent from the descriptions of the embodiments below. Additionally, embodiments not described below that meet the limitations of the claimed invention are also envisioned, as is recognized by those of skill in the art.

Throughout the detailed description, various elements are described as "off-the-shelf." As used herein, "off-the-shelf" means "pre-manufactured" and/or "pre-assembled."

In some instances, features represented by numerical values, such as dimensions, quantities, and other properties that can be represented numerically, are stated as approximations. Unless otherwise stated, an approximate value means "correct to within 50% of the stated value." Thus, a length of approximately 1 inch should be read "1 inch+/−0.5 inch." Similarly, other values not presented as approximations have tolerances around the stated values understood by those skilled in the art. For example, a range of 1-10 should be read "1 to 10 with standard tolerances below 1 and above 10 known and/or understood in the art," and a value of 5 should be read "5 with standard tolerances above and below 5 as known and/or understood in the art."

Figure 1:
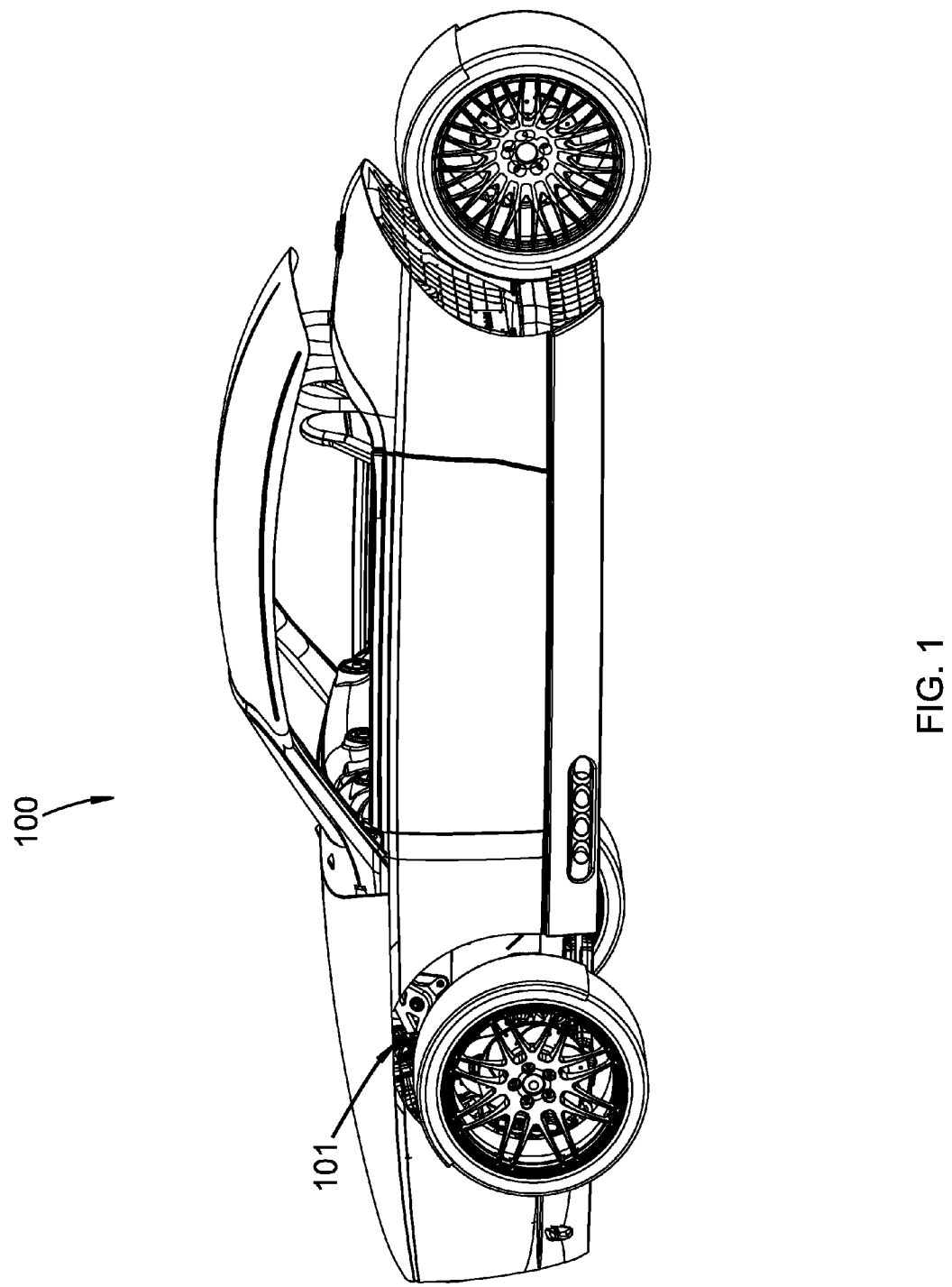
FIG. 1 depicts one embodiment of a vehicle on which the claimed system is used.
Figure 2A:
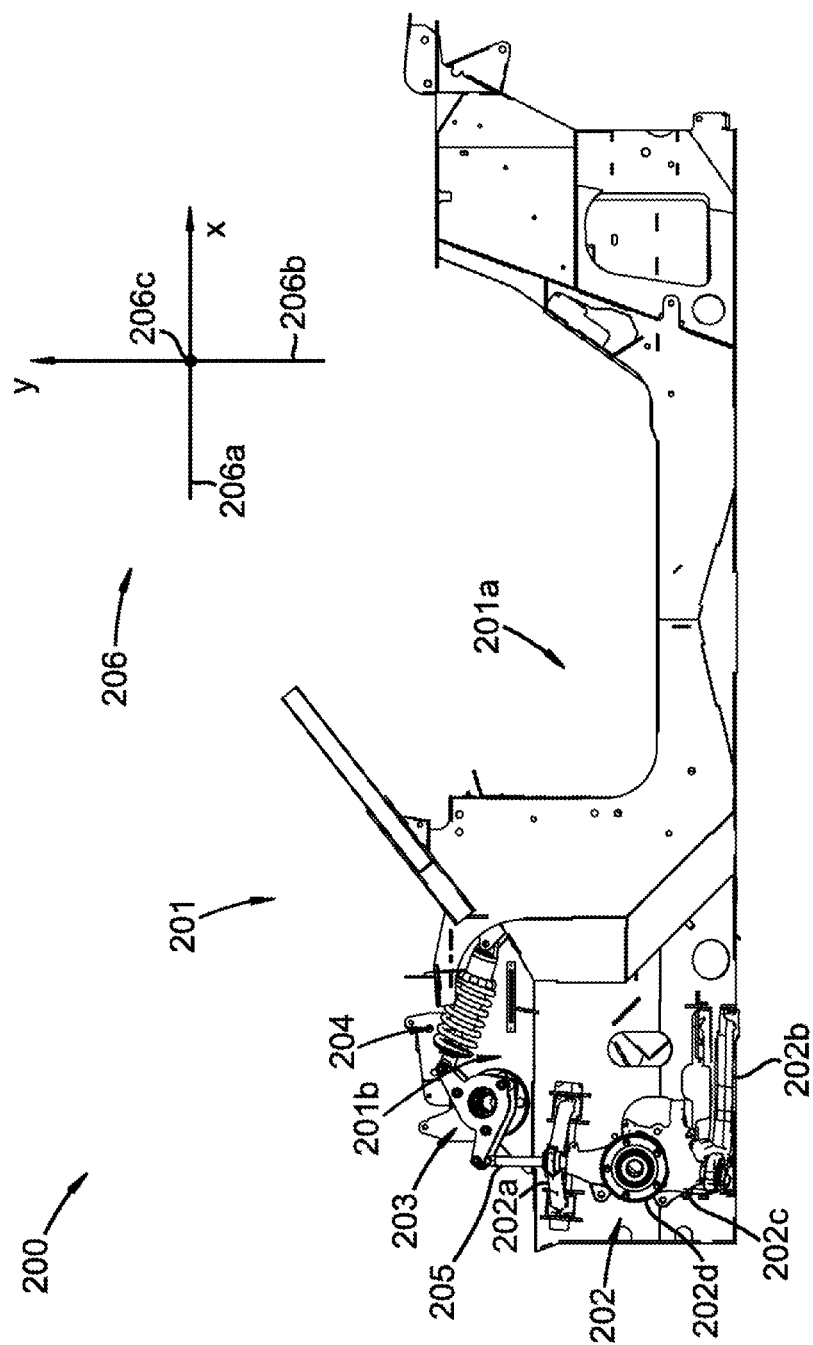
FIGS. 2A-D depict various views of a suspension system according to the claimed invention coupled to a unitized vehicle frame.
Figure 2B:
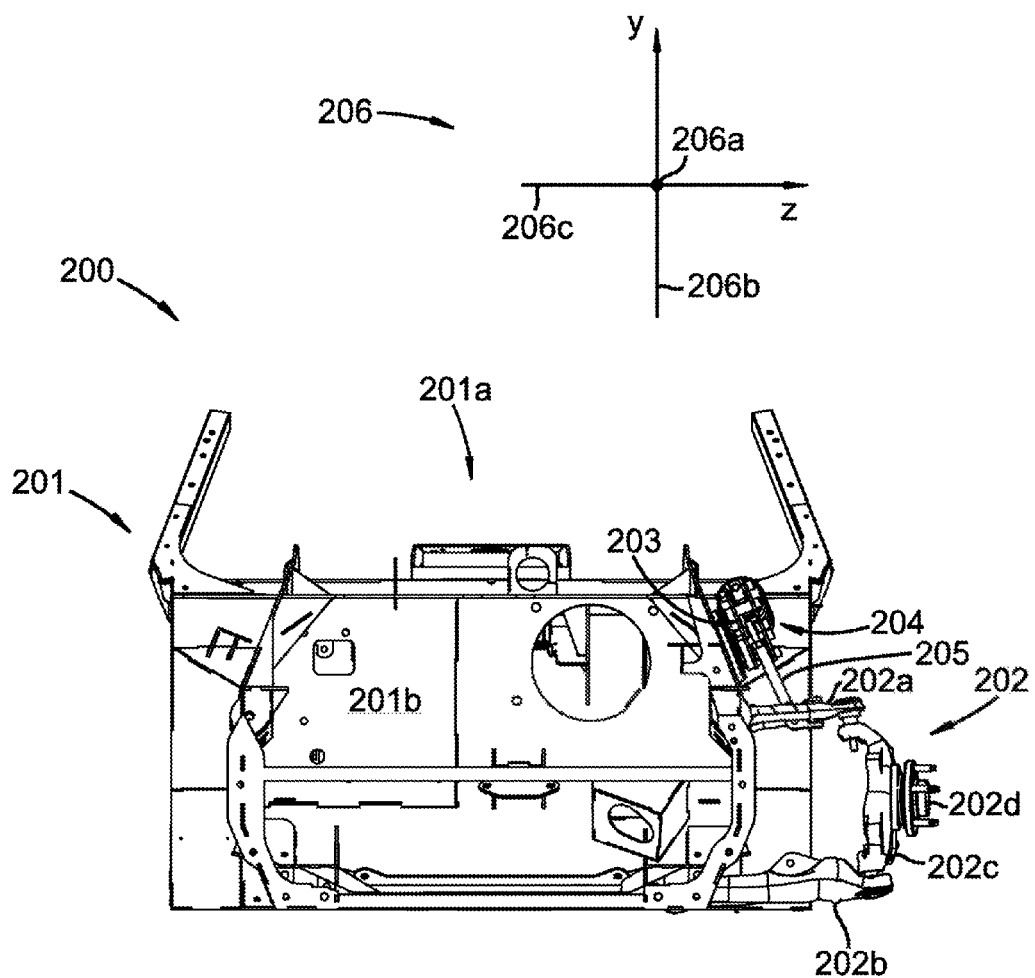
Figure 2C:
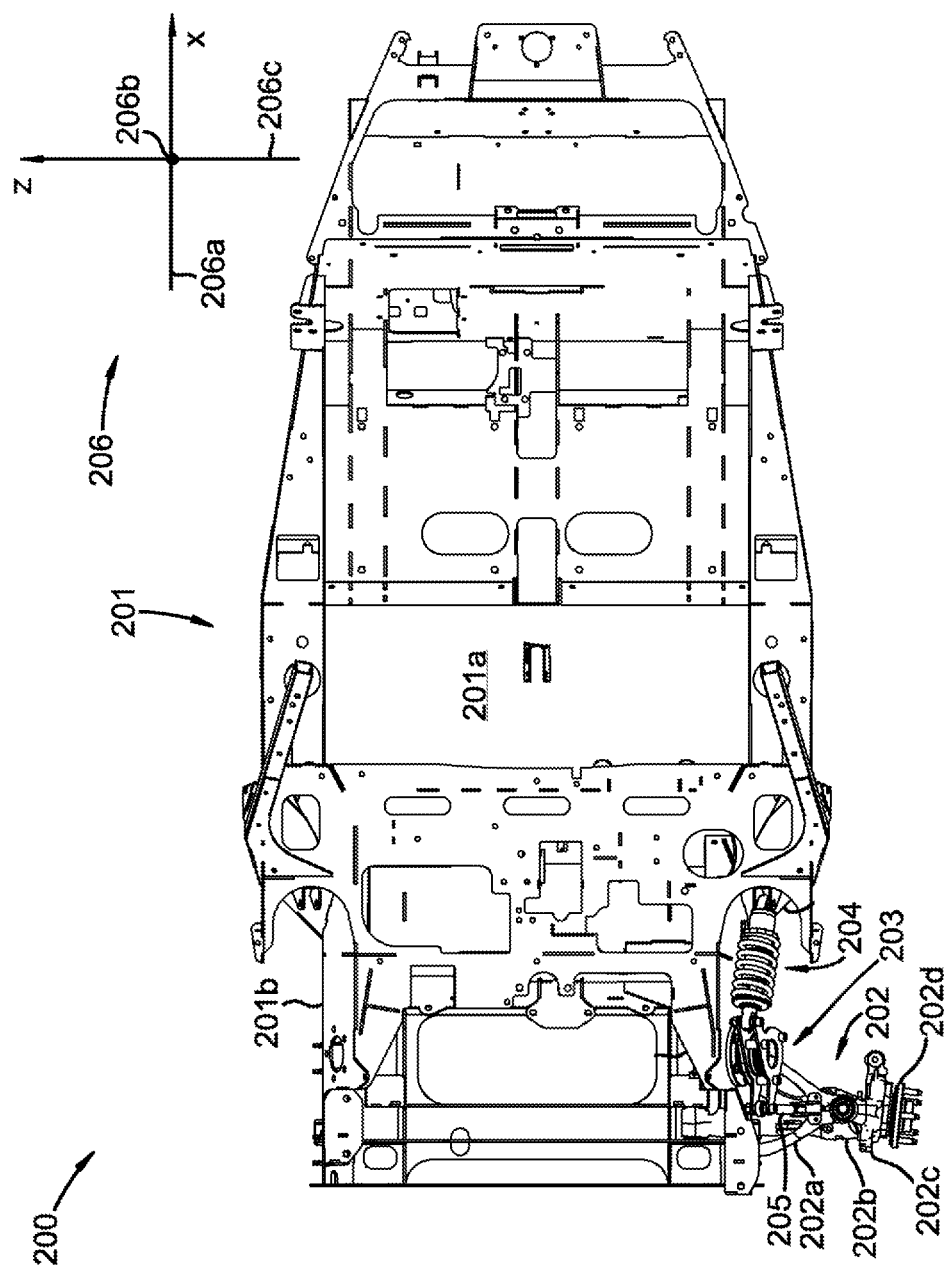
Figure 2D:
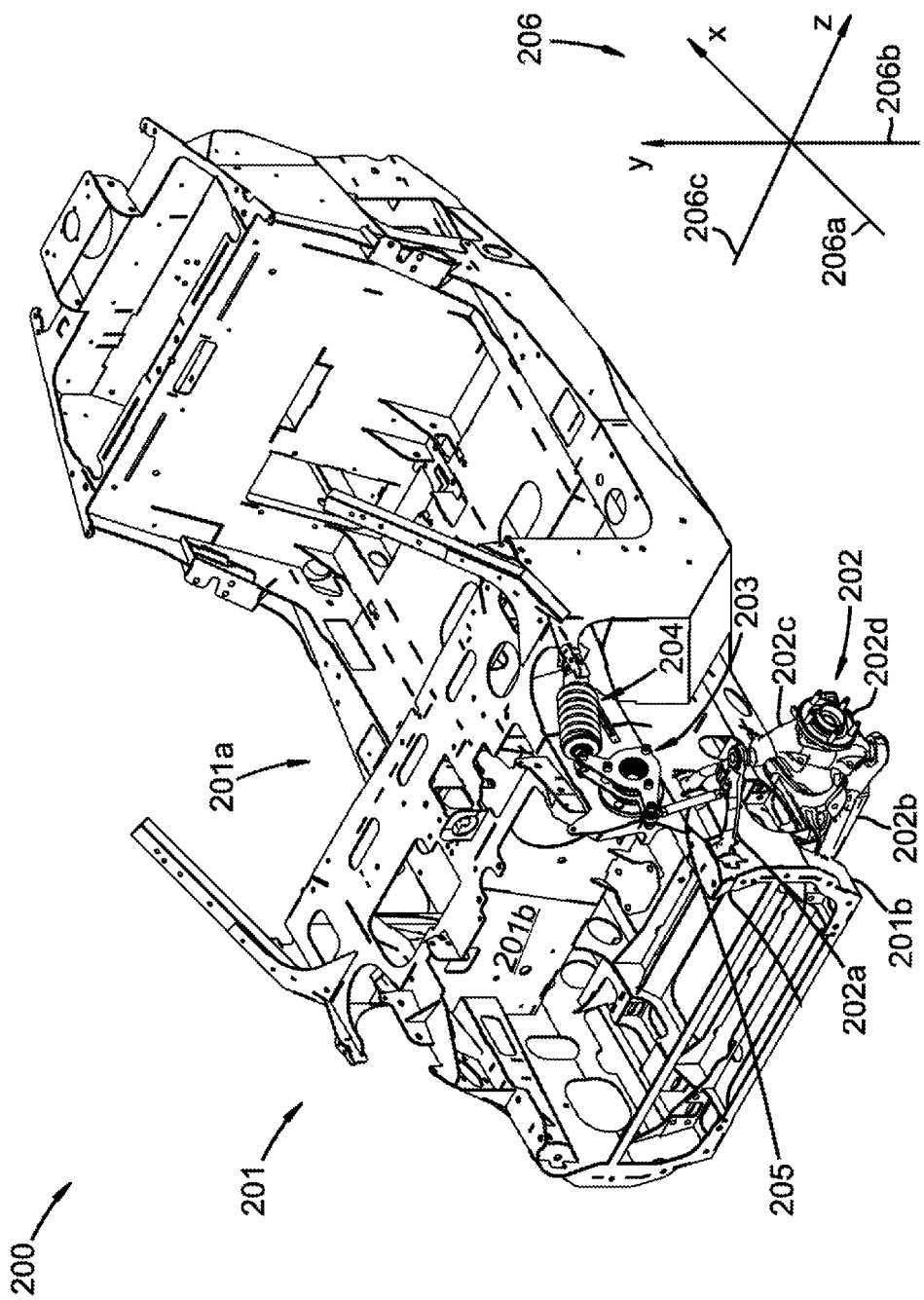
Figure 3A:
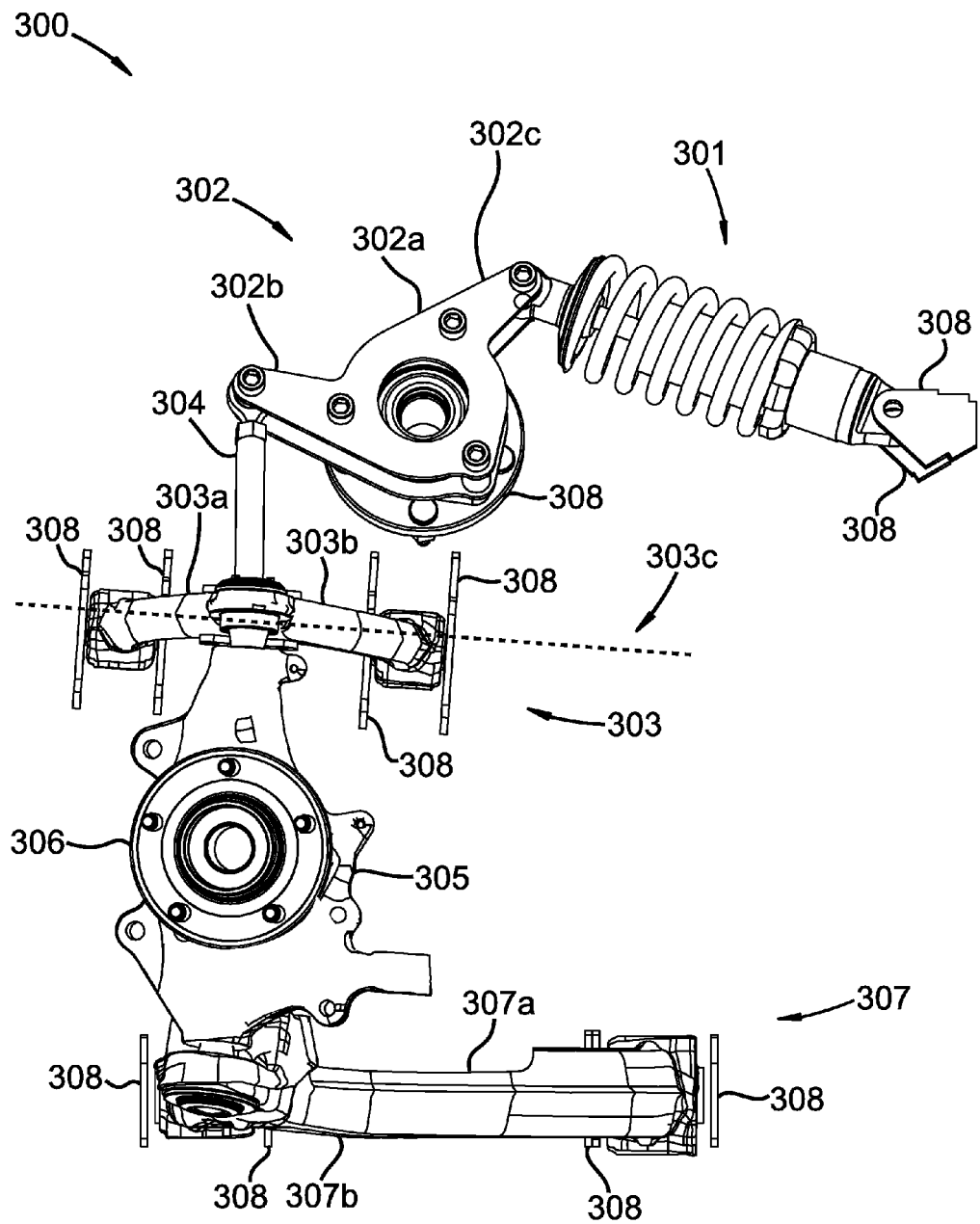
FIGS. 3A-D depict a suspension system and various frame-coupling mechanisms according to the claimed invention.
Figure 3B:
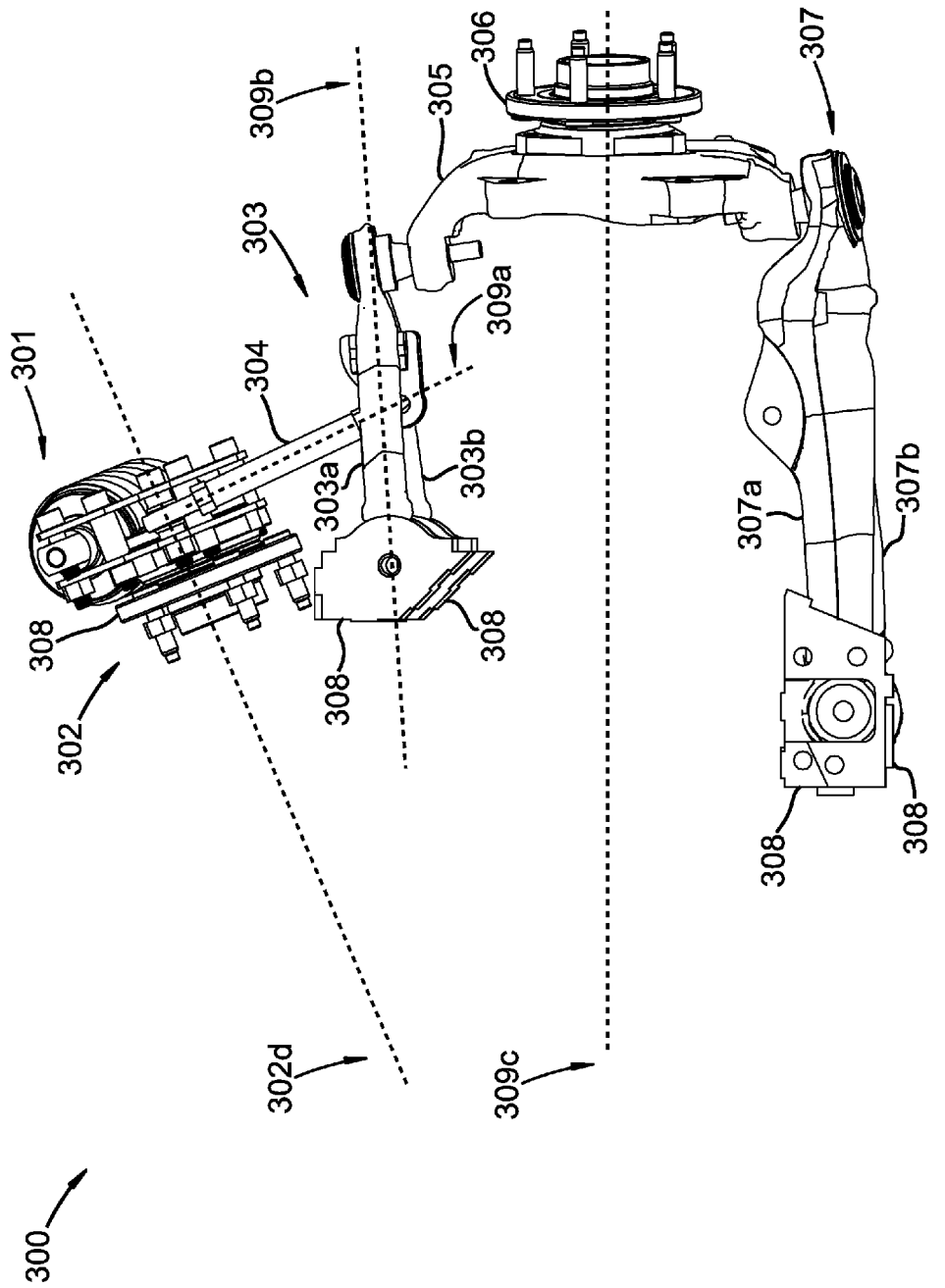
Figure 3C:
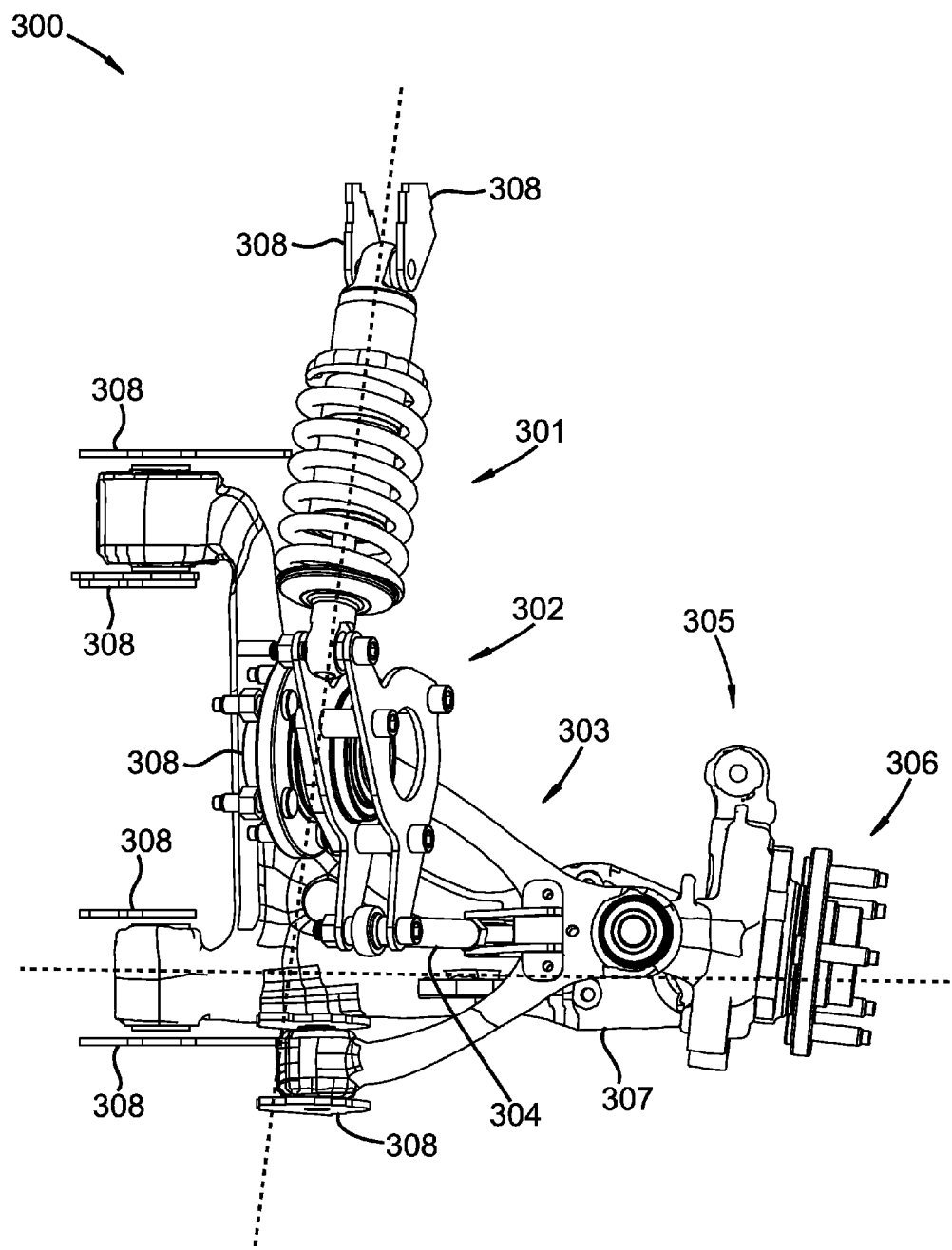
Figure 3D:
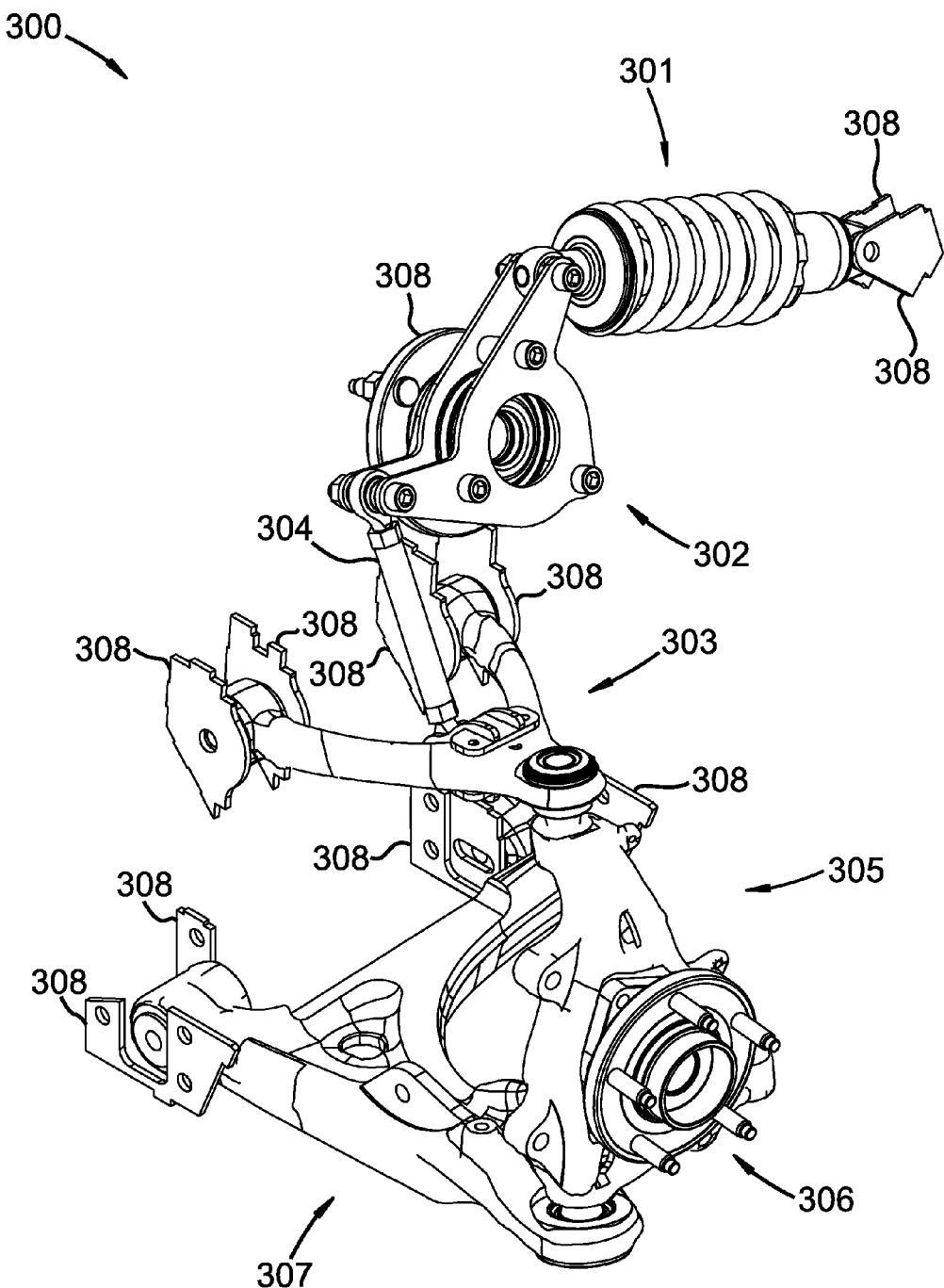

FIG. 1 depicts one embodiment of a vehicle on which the claimed system is used. Vehicle 100 is a three-wheeled, front-wheel drive vehicle. Vehicle 100 includes front-wheel suspension system 101, embodiments of which are described below in more detail. Although the depicted embodiment is a three-wheeled, front-wheel drive vehicle, in some embodiments, vehicle 100 is a four-wheeled vehicle, a rear-wheel drive vehicle, and/or an all-wheel or four-wheel drive vehicle. Some embodiments of vehicle 100 include active four-wheel steering. In yet other embodiments, vehicle 100 is an aircraft. In some embodiments, vehicle 100 is even an amphibious vehicle. Similarly, although suspension system 101 is depicted as a front-wheel suspension system, in other embodiments, system 101 is a rear-wheel suspension system. In some embodiments, system 101 is coupled to a drive wheel and includes a drive axle. In the same or other embodiments, system 101 includes steering components. In other embodiments, system 101 is coupled to a non-drive wheel and, in some embodiments, includes steering components.

FIGS. 2A-D depict various views of a suspension system according to the claimed invention coupled to a unitized vehicle frame. System 200 includes unitized frame 201, control arm assembly 202, bell crank 203, and shock 204. Additionally, in some embodiments, system 200 includes pushrod 205. Frame 201 includes passenger compartment 201a and, in some embodiments, engine cowling 201b. Control arm assembly 202 is coupled to at least a portion of the unitized frame, and includes upper control arm 202a and lower control arm 202b. Additionally, in some embodiments, control arm assembly 202 includes steering knuckle 202c and/or hub 202d. Bell crank 203 is disposed above upper control arm 202a and is pivotally coupled to upper control arm 202a and frame 201. In some embodiments, bell crank 203 is pivotally coupled to cowling 201b. Shock 204 is coupled to bell crank 203 and frame 201, and is disposed between passenger compartment 201a and bell crank 203. Furthermore, as shown upper control arm 202a is coupled to bell crank 203 by pushrod 205.

Frame 201 includes any of a variety of unitized frame types and structures. In the depicted embodiment, frame 201 incorporates passenger compartment 201a and engine cowling 201b. However, in some embodiments, engine cowling 201b is a sub frame that distributes vibration from the engine, suspension, and/or drivetrain away from passenger compartment 201a. In some other embodiments, frame 201 is a unitized body structure integrated into an overall body-on-frame structure. For example, in some embodiments, frame 201 includes separate unitized structures for passenger compartment 201a and engine cowling 201b, each mounted to a chassis. In some such embodiments, control arm assembly 202, bell crank 203, and/or shock 204 are mounted directly to the chassis. In some other embodiments, frame 201 is a monocoque or semi-monocoque structure.

Engine cowling 201b forms an engine compartment that at least partially encloses various engine components, such as the motor, transmission, and cooling system. Similarly, passenger compartment 201a houses vehicle components that provide support and comfort for passengers, such as seats, a steering wheel, a throttle and brake, a shifter, and various other so-called "creature-comforts." Though depicted as a land vehicle passenger compartment, passenger compartment 201a is, in other embodiments, a fuselage of an aircraft or a helm, cockpit, or inside a hull of an amphibious vehicle. Similarly, engine cowling 201b houses the vehicle engine in any of a variety of land, air, and/or amphibious vehicles. Additionally, engine cowling 201b, in some embodiments, directly supports the vehicle engine. Furthermore, in some embodiments, engine cowling 201b includes a firewall separating the engine from passenger compartment 201a. In some such embodiments, shock 204 is coupled to the firewall.

Control arm assembly 202 couples a wheel to the vehicle. The wheel is mounted to hub 202d, which in turn is supported by steering knuckle 202c. Steering knuckle 202c is disposed between upper control arm 202a and lower control arm 202b, and couples hub 202d to upper and lower control arms 202a,b. Upper control arm 202a is pivotally coupled to frame 201. In some embodiments that include engine cowling 201b, upper control arm 202a is coupled to engine cowling 201b. Similarly, lower control arm 202b is pivotally coupled to frame 201. In some embodiments that include engine cowling 201b, lower control arm 202b is coupled to engine cowling 201b. Upper and lower control arms 202a,b include a variety of configurations, such as single-arm control arms and wishbone control arms. One of skill in the art recognizes, however, that varying the configuration of the control arms also requires changes in positioning and coupling to frame 201. For example, a single arm configuration will require a stronger coupling and different positioning as compared to a double-arm or wishbone configuration in order to accomplish the same center of gravity and sprung mass. Thus, it is not necessarily obvious from other single- and double-arm configuration designs to achieve the results of the configurations described herein.

In the depicted embodiment, upper and lower control arms 202a,b are pivotally coupled to frame 201, for example by u-joints and/or cylindrical joints, such that upper and lower control arms 202a,b rotate around x-axis 206a of coordinate system 206, but are fixed with regard to rotation about y-axis 206b and z-axis 206c. Additionally in the depicted embodiment, upper and lower control arms 202a,b are coupled to steering knuckle 202c such that upper and lower control arms 202a,b move in concert. However, in other embodiments, other types of rotation and coupling occur. For example, in some embodiments, upper control arm 202a and/or lower control arm 202b include one or more ball joints that allow for rotation about multiple axes. In the same or other embodiments, upper control arm 202a and/or lower control arm 202b are movably and/or pivotally coupled to steering knuckle 202c, or, alternatively, directly to hub 202d, to allow for independent movement of one control arm with respect to the other. This is particularly beneficial in maintaining a constant camber with respect to a driving surface.

As shown in the depicted embodiment, upper control arm 202a is an A-arm, or wishbone, control arm having a first arm and a second arm (each of which are similar to those shown in more detail, and described with regard to FIGS. 3A-D, 5 and 7). The second arm is disposed between the first arm and passenger compartment 201a. Pushrod 205 is pivotally coupled to upper control arm 202a at the intersection between the first and second arms. Pushrod 205 is also pivotally coupled to bell crank 203, which is disposed over at least a portion of the second arm, but not over any portion of the first arm. For example, as shown, bell crank 203 is disposed over a position on cowling 201b where the second arm couples to cowling 201b. In some embodiments, a pivot point of bell crank 203 that couples bell crank 203 to frame 201 (similar to that shown in, and described with regard to FIGS. 4A-B) is disposed over a position on frame 201 where the second arm couples to frame 201. In the depicted embodiment, pushrod 205 is coupled to upper control arm 202a, for example by a u-joint or cylindrical joint, such that pushrod 205 rotates roughly about x-axis 206a. However, in other embodiments, pushrod 205 is coupled to upper control arm 202a such that pushrod 205 rotates about multiple axes, such as by coupling pushrod 205 to upper control arm 202a by a ball joint and/or by adjusting the positioning of bell crank 203 on frame 201. However, one of skill in the art recognizes that adjusting the relative positioning of suspension components affects the distribution of forces and stresses caused by active suspension, which can affect the overall design of the vehicle. Thus, in many cases, it would not be obvious to simply move the positioning of one or more of the suspension components without making drastic changes to the overall vehicle frame and/or suspension design to account for the varied force distributions associated with various suspension component positions.

Similar to upper control arm 202a, in the depicted embodiment, lower control arm 202b is a L-arm control arm having a first arm and a second arm (each of which are similar to those shown in more detail, and described with regard to FIGS. 3A-D, 5 and 7), the lower second arm disposed between the lower first arm and passenger compartment 201a. As shown, the lower second arm is coupled to cowling 201b closer to passenger compartment 201a than bell crank 203. The lower second arm is also coupled to cowling 201b closer to passenger compartment 201a. Additionally, shock 204 is disposed at least partially over the second arm, the lower first arm is disposed closer to passenger compartment 201a than the upper first arm, and the lower first arm is aligned along z-axis 206c with a centerline axis of steering knuckle 202c, where the lower second arm is aligned and mounted closer to passenger compartment 201a than steering knuckle 202c.

In embodiments where upper control arm 202a is a single-arm control arm, upper control arm 202a includes a broader coupling to frame 201 than for each arm in wishbone configurations, and is aligned with the centerline axis of the hub carrier along the z-axis. Bell crank 203 and shock 204 are positioned lower on cowling 201b, and pushrod 205 is shorter. Alternatively, bell crank 203 is smaller and/or lighter to accommodate for the reduced mass of upper control arm 202a. In embodiments where lower control arm 202b is a single arm control arm, lower control arm 202b also includes a broader and sturdier coupling to frame 201 than for each arm in wishbone configurations. Additionally, either upper control arm 202b is coupled closer to passenger compartment 201a than the lower first arm in wishbone configurations, or bell crank 203 and/or shock 204 are shifted closer to passenger compartment 201a. In such cases, the length of frame 201 is extended to account for the extra space needed to accommodate bell crank 203 and shock 204. Extending frame 201 results, again, in shifting the center of gravity, which is accommodated for in other ways. Extending frame 201 and/or shifting the suspension components is not desirable, feasible, and/or a clear alternative in previously-presented vehicle designs because of the complexity involved; such changes, in many cases, would require a complete redesign of the vehicle. It has been found that the embodiments described herein are most well-suited for three-wheeled and/or front-wheel drive vehicles.

Figure 4A:
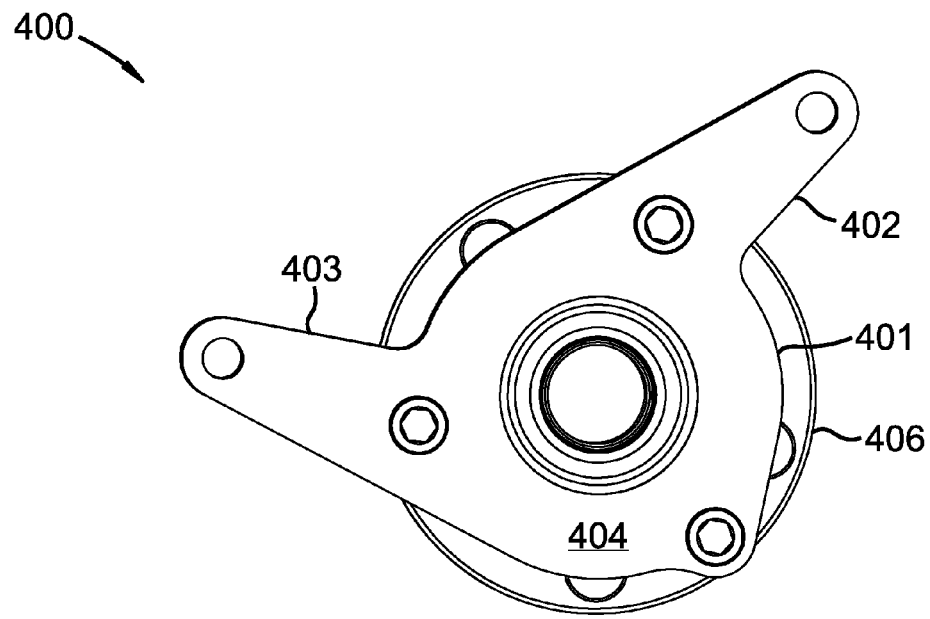
FIGS. 4A-B depict two views of a bell crank for use in a suspension system according to the claimed invention.
Figure 4B:
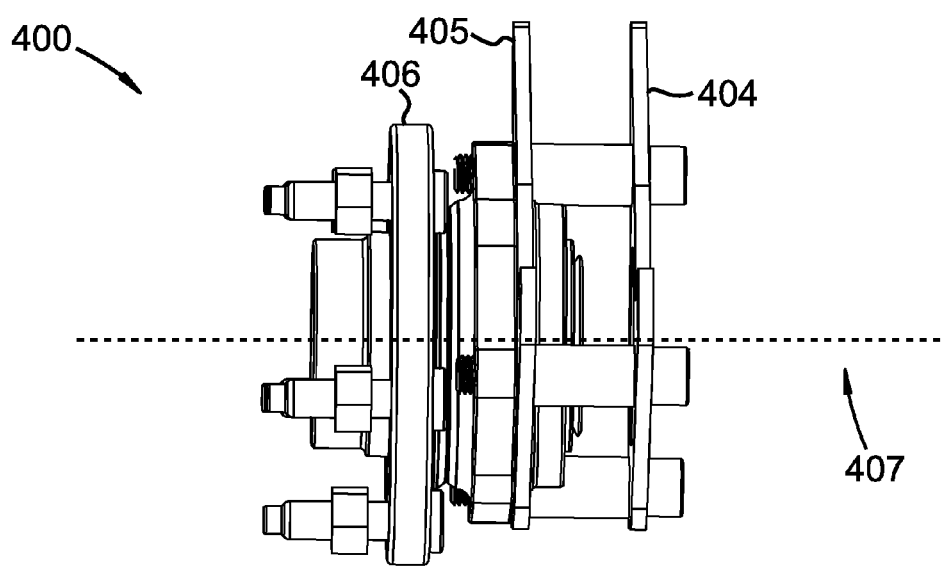

Bell crank 203 includes any of a variety of bell crank configurations, and is similar to that depicted in, and described with more detail regarding FIGS. 4A-B. Similarly, shock 204 includes any of a variety of shock-and-spring configurations. The depicted coil-over-shock configuration has been found to be most beneficial in lowering the center of gravity and reducing the unsprung mass; by shifting shock 204 and bell crank 203 along x-axis 206a towards passenger compartment 201a, and by utilizing a double-wishbone control arm assembly configuration, the vehicle's center of gravity is lowered compared to, for example, vehicles with Macpherson suspension systems. The unsprung mass is also reduced compared to traditional double-wishbone suspension systems where the shock and/or spring are coupled to the lower control arm. The center of gravity remains similar to other double-wishbone suspension systems, however there is more room for the drive axle and steering arm or arms, which improves ease of maintenance. As described above, other double-wishbone systems cannot be modified with the features described herein without having to modify virtually every other design aspect of the corresponding vehicle, with compounding complexity.

Along a plane formed by x-axis 206a and y-axis 206b, pushrod 205 forms an angle with upper control arm 201a ranging from 80° to 100° at ride height, and forms an angle with bell crank 203 ranging from 80° to 100°. In one specific embodiment, the pushrod-upper control arm angle is 89° at ride height, and the pushrod-bell crank angle is 91° at ride height. Conversely, in another embodiment, the pushrod-upper control arm angle is 91° at ride height and the pushrod-bell crank angle is 89° at ride height. Along the same plane, bell crank 203 forms an angle with shock 204 ranging from 100° to 110° at ride height. In one specific embodiment, the bell crank-shock angle is 105° at ride height. Additionally, as depicted, the bell crank-shock angle and the pushrod-bell crank angle are generally faced the same direction, and are faced a direction opposite an angle formed between arms coupling the pushrod and shock to bell crank 203 (such as those depicted in, and described in more detail regarding FIGS. 4A-B). Along a plane formed by y-axis 206b and z-axis 206c, pushrod 205 forms an angle with upper control arm 201a ranging from 110° to 130° at ride height. In one specific embodiment, the angle is 120° at ride height.

FIGS. 3A-D depict a suspension system and various frame-coupling mechanisms according to the claimed invention. System 300 includes shock 301, bell crank 302, upper control arm 303, pushrod 304, hub carrier 305, hub 306, lower control arm 307, and frame couplers 308. Upper control arm 303 is, in the depicted embodiment, an A-arm, and includes first arm 303a and second arm 303b. Lower control arm 307 is, in the depicted embodiment, an L-arm, and includes first arm 307a and second arm 307b. Various axes 309a,b,c are also depicted.

As shown, bell crank 302 includes cylindrical portion 302a and arms 302b,c. Bell crank 302 couples to a vehicle frame (such as that depicted and described above with regard to FIGS. 2A-D) along central axis 302d of cylindrical portion 302a. Central axis 302d intersects with hub axis 309c at ride height at an angle ranging from 20° to 40°. In one embodiment, central axis 302d intersects with hub axis 309c at ride height at a 30° angle. Additionally, upper control arm centerline axis 309b intersects with pushrod centerline axis 309a at an angle ranging from 130° to 110°. In one embodiment, upper control arm centerline axis 309b intersects with pushrod centerline axis at a 120° angle. Throughout the travel of suspension system 300, the angle between axes 309a and 309b changes, the change ranging between 5° and 20°.

As shown, pushrod 304 is perpendicular to upper control arm cross-sectional axis 303c. However, in various embodiments, the ride height angle between pushrod 304 and axis 303c ranges from 80° to 80°. Throughout the travel of suspension system 300, the angle between pushrod 304 and axis 303c changes, the change ranging from 1° to 5°. In one embodiment that angle is 89°. Pushrod 304 also forms an angle with bell crank arm 302b ranging from 100° to 80° at ride height. Also in the depicted embodiment, lower control arm 307 forms a slight angle, ranging from 1° to 3° at ride height, with a bottom of a vehicle frame corresponding to suspension system 300. Under normal driving conditions, with such configurations, hub 306 travels 6 to 8 inches, top-to bottom. For example, in one specific embodiment, hub 306 travels up 2 inches and down 4 inches.

Shock 301, bell crank 302, and pushrod 304 are, in the depicted embodiment, parallel to a plane that is formed partially by axis 309a and is perpendicular to axis 309b.

The various angles, lengths, and ranges described above correspond to the specifically-depicted embodiment in FIGS. 3A-D. Variations from the described ranges necessarily require other design changes, such as is described above with regard to FIGS. 2A-D.

FIGS. 4A-B depict two views of a bell crank for use in a suspension system according to the claimed invention. Bell crank 400 includes cylindrical portion 401, arm 402, arm 403, front plate 404, back plate 405, frame coupler 406, and central axis 407. Arms 402, 403 extend tangentially from cylindrical portion 401. The angle between arms 402, 403 ranges from 115° to 135° at ride height. In one embodiment that angle is 122° at ride height. Additionally, arms 402, 403 each have a side tangential to cylindrical portion 401 and a side intersecting cylindrical portion 401.

Figure 5:
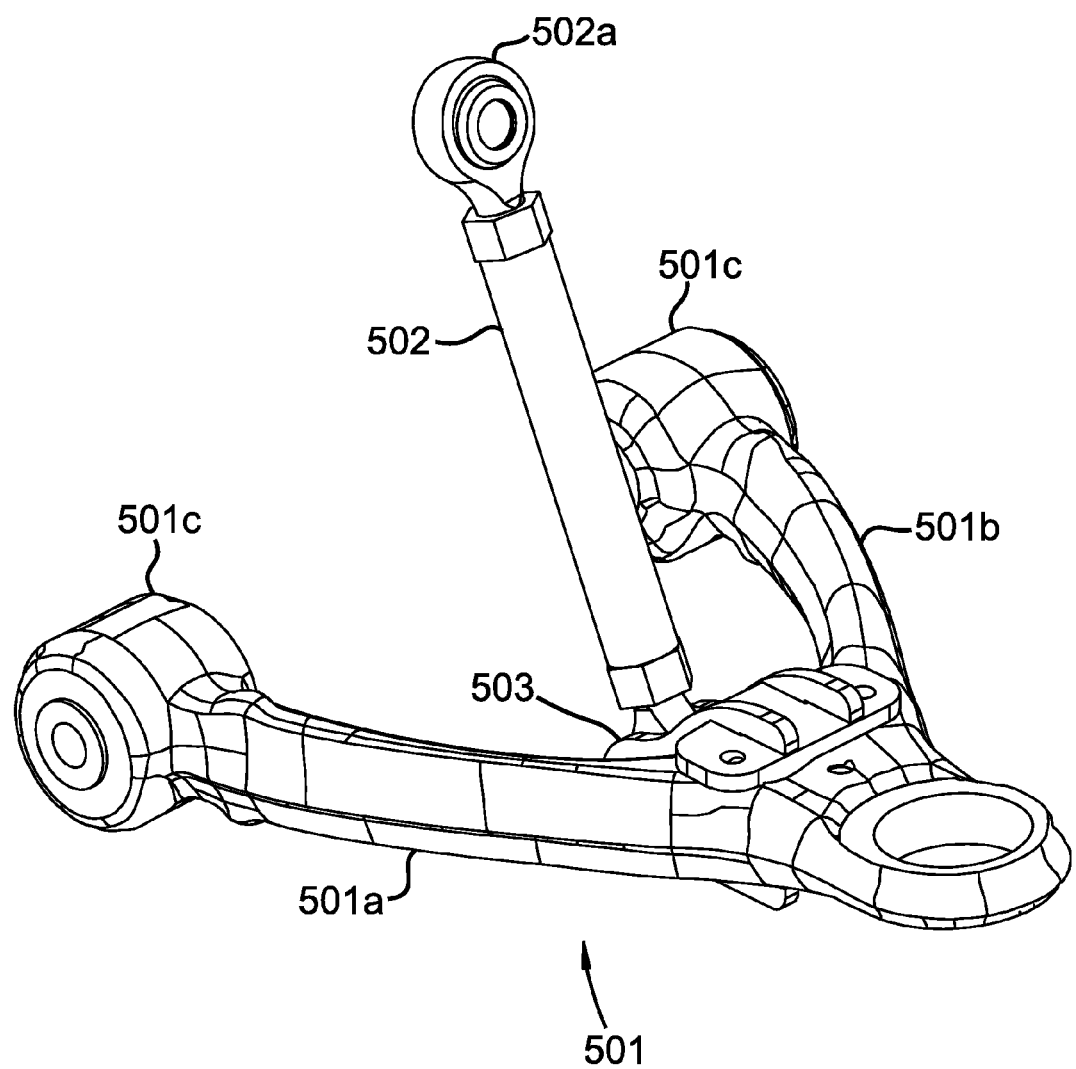
FIG. 5 depicts one embodiment of an upper control arm and pushrod for use in a suspension system according to the claimed invention.

FIG. 5 depicts one embodiment of an upper control arm and pushrod for use in a suspension system according to the claimed invention. Upper control arm 501 includes first arm 501a and second arm 501b, each coupled to a vehicle frame by cylindrical joints 501c. Pushrod 502 includes heim joint 502a, and is coupled to control arm 501 at the intersection between first arm 501a and second arm 501b by cylindrical joint 503. Heim joint 502a couples pushrod 502 to a bell crank (similar to those depicted in, and described with regard to FIGS. 2A-4B) disposed over pushrod 502 and upper control arm 501.

Figure 6:
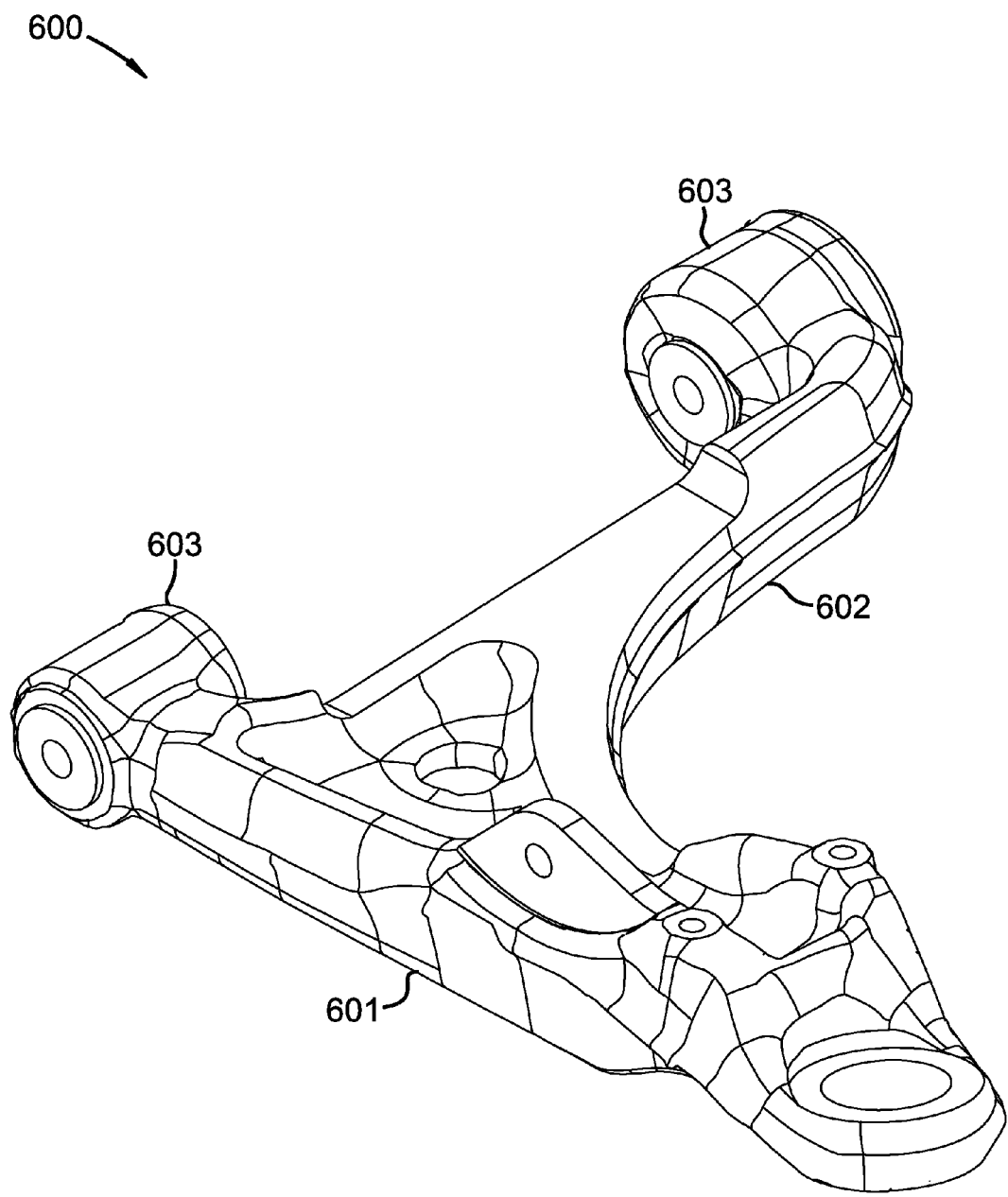
FIG. 6 depicts one embodiment of a lower control arm for use in a suspension system according to the claimed invention.

FIG. 6 depicts one embodiment of a lower control arm for use in a suspension system according to the claimed invention. Lower control arm 600 includes first arm 601 and second arm 602, each coupled to a vehicle frame by cylindrical joints 603.

We claim:

1. A vehicle suspension system, comprising:
a unitized frame having a passenger compartment;
a control arm assembly coupled to the frame, the assembly comprising upper and lower control arms and a steering knuckle pivotally coupled between the upper and lower control arms;
a pushrod coupled to the upper control arm extending above the upper control arm, forming a first angle with the upper control arm along a first axis, the first angle ranging from 80 to 100 degrees at ride height, and forming a second angle with the upper control arm along a second axis, the second angle ranging from 110 to 130 degrees at ride height;
a bell crank disposed adjacent to the upper control arm between the passenger compartment and the pushrod, comprising a cylindrical portion rotationally coupled to the frame, and comprising first and second arms extending from the cylindrical portion, the arms forming an angle with each other through the bell crank's center of rotation, the bell crank arm angle ranging from 115 degrees to 130 degrees at ride height, the first arm pivotally coupled to the pushrod and forming an angle with the pushrod ranging from 80 to 100 degrees at ride height; and
a shock assembly coupled to the second bell crank arm and the frame, forming an angle with the second bell crank arm ranging from 100 to 110 degrees at ride height, the shock-bell crank arm angle facing a direction opposite the bell crank arm angle, and the shock assembly disposed between the passenger compartment and the bell crank.

2. The vehicle suspension system of claim 1, wherein the first angle is 89 degrees at ride height.

3. The vehicle suspension system of claim 1, wherein the second angle is 120 degrees at ride height.

4. The vehicle suspension system of claim 1, wherein the bell crank arm angle is 122 degrees at ride height.

5. The vehicle suspension system of claim 1, wherein the first arm-pushrod angle is 89 degrees at ride height.

6. The vehicle suspension system of claim 1, wherein the second arm-shock angle is 105 degrees at ride height.

7. The vehicle suspension system of claim 1, wherein each bell crank arm has a side tangential to the cylindrical portion and a side intersecting the cylindrical portion.

8. The vehicle suspension system of claim 1, wherein the pushrod is parallel to the bell crank along a plane perpendicular to the second axis.

9. The vehicle suspension system of claim 1, wherein the shock assembly is parallel to the bell crank along a plane perpendicular to the second axis.

10. The vehicle suspension system of claim 1, wherein the upper and lower control arms are pivotally coupled to the frame.

11. The vehicle suspension system of claim 1, wherein the upper control arm is a wishbone control arm having a first upper arm and a second upper arm, the second upper arm disposed between the first upper arm and the passenger compartment.

12. The vehicle suspension system of claim 11, wherein the pushrod is coupled to the upper control arm at the intersection between the first and second upper arms.

13. The vehicle suspension system of claim 11, wherein the bell crank is disposed over at least a portion of the second upper arm.

14. The vehicle suspension system of claim 13, wherein the rotational axis of the cylindrical portion is disposed over a position on the frame where the second upper arm couples to the frame.

15. The vehicle suspension system of claim 1, wherein the lower control arm is a wishbone control arm having a first lower arm and a second lower arm, the second lower arm disposed between the first lower arm and the passenger compartment.

16. The vehicle suspension system of claim 15, wherein the second lower arm is coupled to the frame nearer to the passenger compartment than the bell crank.

17. The vehicle suspension system of claim 15, wherein the shock assembly is disposed at least partially over the second lower arm.

18. The vehicle suspension system of claim 15, wherein the first lower arm is aligned with a centerline axis of the steering knuckle and the second lower arm is aligned closer to the passenger compartment than the centerline axis of the steering knuckle.

19. The vehicle suspension system of claim 1, wherein the upper control arm is a wishbone control arm having a first upper arm and a second upper arm, the second upper arm disposed between the first upper arm and the passenger compartment, and wherein the lower control arm is a wishbone control arm having a first lower arm and a second lower arm, the second lower arm disposed between the first lower arm and the passenger compartment, wherein the second lower arm is coupled to the frame closer to the passenger compartment than the second upper arm, and wherein the first lower arm is disposed closer to the passenger compartment than the first upper arm.

20. The vehicle suspension system of claim 1, the frame further comprising a firewall separating an engine compartment formed by the frame from the passenger compartment, wherein the shock assembly is coupled to the firewall.

* * * * *